United States Patent
Inada et al.

(10) Patent No.: US 8,098,892 B2
(45) Date of Patent: Jan. 17, 2012

(54) BODY POSITION DETECTING APPARATUS

(75) Inventors: Junya Inada, Nishikamo-gun (JP); Takahiro Ishikawa, Nagoya (JP)

(73) Assignee: DENSO CORPORATION, Kariya (JP)

( * ) Notice: Subject to any disclaimer, the term of this patent is extended or adjusted under 35 U.S.C. 154(b) by 714 days.

(21) Appl. No.: 12/285,579

(22) Filed: Oct. 9, 2008

(65) Prior Publication Data

US 2009/0103815 A1    Apr. 23, 2009

(30) Foreign Application Priority Data

Oct. 22, 2007  (JP) ................. 2007-273897

(51) Int. Cl.
G06K 9/00 (2006.01)

(52) U.S. Cl. .................. 382/103; 340/573.1

(58) Field of Classification Search ............ 382/100, 382/103, 106, 107, 117, 118, 181, 190, 195, 382/203, 206; 340/575, 576, 573.1, 573.7; 351/205, 206, 209, 210
See application file for complete search history.

(56) References Cited

U.S. PATENT DOCUMENTS

| | | | | |
|---|---|---|---|---|
| 5,293,427 A | * | 3/1994 | Ueno et al. | 382/103 |
| 5,813,989 A | * | 9/1998 | Saitoh et al. | 600/484 |
| 5,850,254 A | * | 12/1998 | Takano et al. | 348/148 |
| 5,892,855 A | * | 4/1999 | Kakinami et al. | 382/291 |
| 6,021,221 A | * | 2/2000 | Takaha | 382/199 |
| 7,379,564 B2 | * | 5/2008 | Kakinami et al. | 382/104 |
| 7,433,494 B2 | * | 10/2008 | Niwa | 382/103 |

FOREIGN PATENT DOCUMENTS

| | | |
|---|---|---|
| JP | B2-2822508 | 7/1991 |
| JP | A-2003-109015 | 4/2003 |
| JP | A-2005-17117 | 1/2005 |
| JP | A-2007-249352 | 9/2007 |
| JP | A-2007-253726 | 10/2007 |

OTHER PUBLICATIONS

Masanobu Yamamoto, "Ubiquitous Motion Capture and Applications Thereof".

Paul Viola and Michael Jones; "Robust Real-time Object Detection," Second International Workshop on Statistical and Computational Theories of Vision-Modeling, Learning, Computing, and Sampling, Vancouver, CA; Jul. 13, 2001.

Yamamoto, Masanobu; *Ubiquitous Motion Capture and Application Thereof*; Conference on the Study of Visual Information for Detecting a Human Body; Osaka Electro-Communication University; Dec. 10, 2004; obtained from; http://www.osakac.ac.jp/viri/symposium04/yamamoto.pdf.

* cited by examiner

*Primary Examiner* — Anand Bhatnagar
(74) *Attorney, Agent, or Firm* — Posz Law Group, PLC

(57) ABSTRACT

In a body position detecting apparatus, a controller repeatedly acquires image data that includes an object and an operator in a place where the operator is capable of operating the object. When the controller detects that the operator is in an operating position where the operator operates the object, the controller detects a position of a body part of the operator in the image data and the controller sets the position of the body part to an initial position. The controller detects a position of the body part of the operator in the image data that is acquired after the initial position is set, by detecting a displacement from a position of the body part detected last time and accumulating the displacement to the initial position.

14 Claims, 11 Drawing Sheets

15

16

BODY POSITION DETECTING APPARATUS

CROSS REFERENCE TO RELATED APPLICATIONS

The present application is based on and claims priority to Japanese Patent Application No. 2007-273897 filed on Oct. 22, 2007, the contents of which are incorporated in their entirety herein by reference.

BACKGROUND OF THE INVENTION

1. Field of the Invention

The present invention relates to a body position detecting apparatus.

2. Description of the Related Art

In a conventional body position detecting method, a position of a human body is detected without contacting by using a video image as disclosed, for example, in JP-A-2003-109015. In the method, a body model that schematically represents a human body is superimposed on a body in the video image. Then, a position of a feature point of the body model is detected as a coordinate so as to detect the body part. In the method, the body model is required to be superimposed on each frame of the video image. Thus, the method has an issue that a calculation amount is large.

In view of such circumstances, an exemplary method for reducing the calculation amount is disclosed in Masanobu Yamamoto, "Ubiquitous Motion Capture and Applications Thereof", an academic conference of "Study of Visual Information for Detecting A Human Body", at a small hall of a library in Osaka Electro-Communication University, 2004. In the method, an initial position of a body is detected by applying a body model to the body in the video image. After that, a displacement of each body part is detected and the displacement is accumulated to the initial position. Thereby, the calculation amount can be reduced.

In the present case, by accumulating the displacement to the initial position sequentially, a detection error of the displacement may also be accumulated. Thus, the detected position of the body part may be out of an actual position with time. Therefore, the initial position is required for being updated as needed. However, the initial position is difficult to be detected by fitting the body model without a constrained condition.

SUMMARY OF THE INVENTION

In view of the foregoing problems, it is an object of the present invention to provide a body position detecting apparatus.

In a body position detecting apparatus according to a first aspect of the invention, a controller repeatedly acquires image data that includes an object and an operator in a place where the operator is capable of operating the object. When a predetermined instructing condition is satisfied, a control signal from the controller causes an instruction that instructs the operator to operate the object. The controller detects a position of a body part of the operator in the image data that is acquired after the controller instructs the operator and the controller sets the position of the body part to an initial position. The controller detects a position of the body part of the operator in the image data that is acquired after the initial position is set, by detecting a displacement from a position of the body part detected last time and accumulating the displacement to the initial position.

In the present body position detecting apparatus, the controller can detect the position of the body part of the operator in the image data by using a state where the operator operates the object as a constraint condition. Thus, the position of the body part can be detected easily compared with a case where the position of the body part is detected without a constraint condition.

In a body position detecting apparatus according to a second aspect of the invention, a controller repeatedly acquires image data that includes an object and an operator in a place where the operator is capable of operating the object. When the controller detects that the operator is in an operating position where the operator operates the object, the controller detects a position of a body part of the operator in the image data and sets the position of the body part to an initial position. The controller detects a position of the body part of the operator in the image data that is acquired after the initial position is set, by detecting a displacement from a position of the body part detected last time and accumulating the displacement to the initial position.

In the present body position detecting apparatus, the controller can detect the position of the body part of the operator in the image data by using a state where the operator operates the object as a constraint condition. Thus, the position of the body part can be detected easily compared with a case where the position of the body part is detected without a constraint condition.

BRIEF DESCRIPTION OF THE DRAWINGS

Additional objects and advantages of the present invention will be more readily apparent from the following detailed description of preferred embodiments when taken together with the accompanying drawings. In the drawings.

DETAILED DESCRIPTION OF THE PREFERRED EMBODIMENTS

First Embodiment

Figure 1:
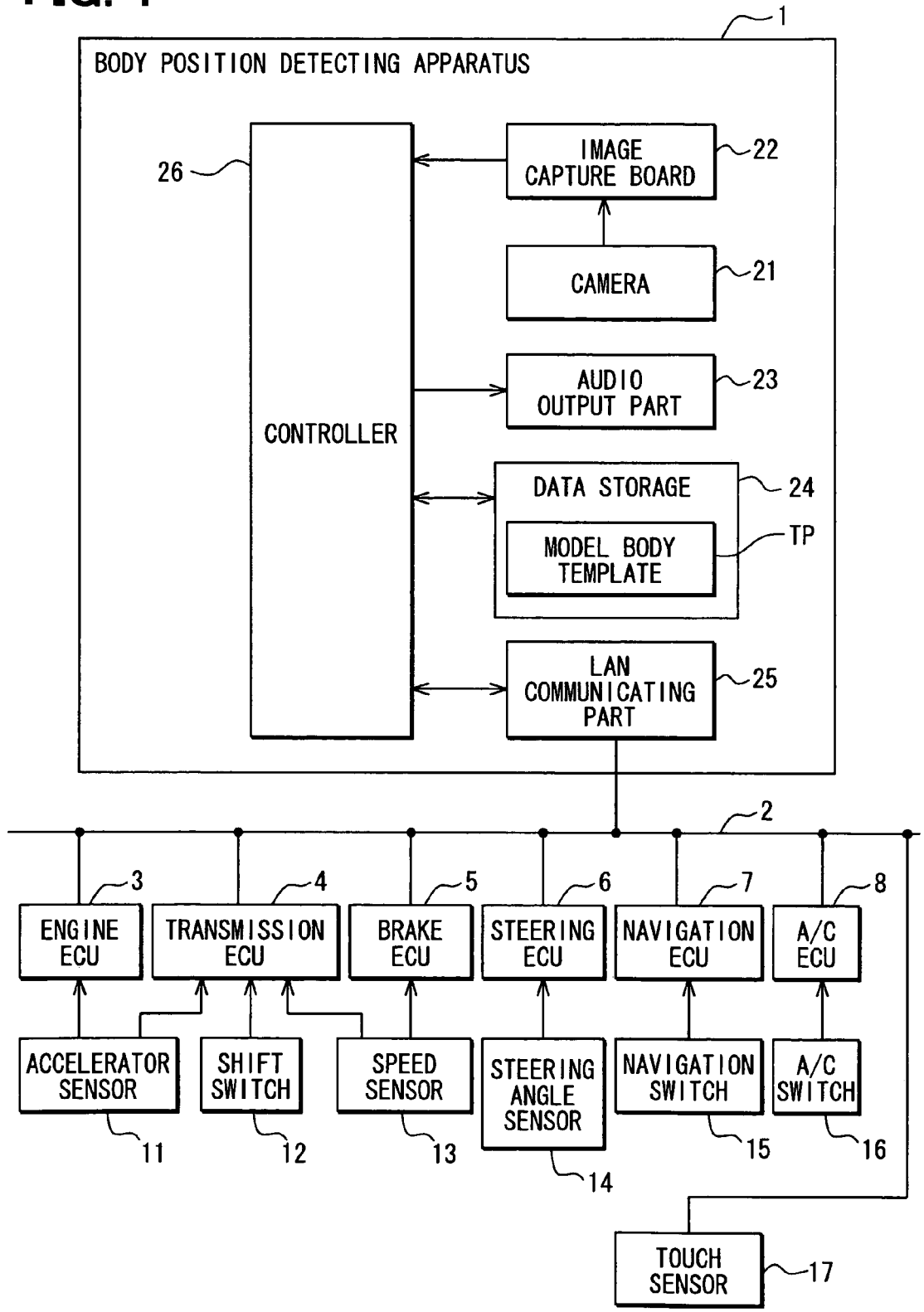
FIG. 1 is a block diagram illustrating a body position detecting apparatus according to a first embodiment of the invention and an in-vehicle local area network coupled with the body position detecting apparatus.

A body position detecting apparatus 1 according to a first embodiment of the invention will be described with reference to FIG. 1. The body position detecting apparatus 1 is provided in a vehicle, for example. The body position detecting apparatus 1 is coupled with various electronic control units (ECU) including an engine ECU 3, a transmission ECU 4, a brake ECU 5, a steering ECU 6, a navigation ECU 7, and an air-conditioner ECU (A/C ECU) 8 and various in-vehicle electronic devices through an in-vehicle local area network (in-vehicle LAN) 2.

The engine ECU 3 controls a rotation of an engine of the vehicle based on a detection signal from an accelerator sensor 11. The accelerator sensor 11 detects an opening degree of an accelerator in accordance with a pressed amount of an accelerator pedal operated by a driver.

The transmission ECU 4 controls a transmission gear ratio of an automatic transmission based on an operating state of the vehicle. The transmission ECU 4 determines the operating state of the vehicle based on a detection signal from a shift switch 12 that detects a selected position of a shift lever (e.g., P, R, N, D, 1st, and 2nd) operated by the driver, the detection signal from the accelerator sensor 11, and a detection signal from a speed sensor 13 that detects a speed of the vehicle, for example.

The brake ECU 5 controls an antilock brake system (ABS) and a traction control system based on a detection signal from a master cylinder pressure sensor (not shown) and the detection signal from the speed sensor 13. The master cylinder pressure sensor detects an operating amount of a brake based on a hydraulic pressure of a master cylinder that feeds a brake oil with applying pressure in accordance with a pressed amount of a brake pedal operated by the driver.

The steering ECU 6 controls a power steering based on a detection signal from a steering angle sensor 14 that detects a steering angle of a front wheel. The power steering generates an assist force when a steering wheel 18 is operated so as to change the steering angle.

The navigation ECU 7 detects the present location of the vehicle based on a global positioning system (GPS) signal received by a GPS antenna (not shown) and provides a routing assistance from the present location to a destination. The navigation ECU 7 is disposed adjacent to a display panel of a navigation device (not shown). The navigation ECU 7 changes an image display of the navigation device based on a signal from a navigation switch 15. The navigation switch 15 includes a present location switch for displaying the present location of the vehicle on the display panel and a broad/detail switch for zooming in and zooming out a map displayed on the display panel.

The A/C ECU 8 controls an air conditioner based on an air-conditioner switch (A/C switch) 16 and a temperature sensor (not shown). The A/C switch 16 includes an on/off switch for activating and deactivating the air conditioner and a temperature setting switch for setting a target temperature. The temperature sensor detects a temperature in a vehicle compartment and a temperature at an outside of the vehicle.

The various information detected by the ECUs 3-8, i.e., information including the opening degree of the accelerator, the position of the shift lever, the speed of the vehicle, and the steering angle is transmitted and received by each of the ECUs 3-8 through the in-vehicle LAN 2.

Figure 2:
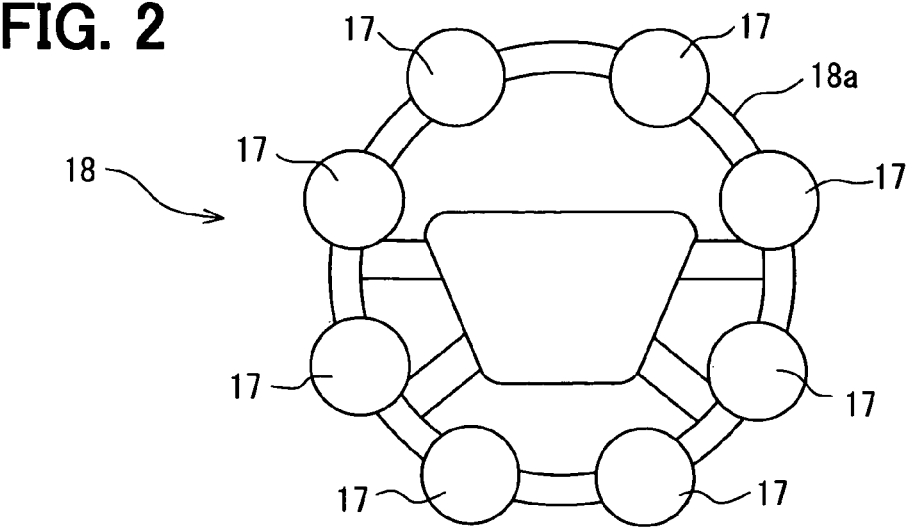
FIG. 2 is a front view illustrating an arrangement of a plurality of touch sensors embedded in a steering wheel.

As illustrated in FIG. 2, the steering wheel 18 includes a handle portion 18a having a ring shape. In the handle portion 18a, a plurality of touch sensors 17, for example, eight touch sensors 17 are embedded. For example, the eight touch sensors 17 are arranged at substantially even intervals along a circumferential of the handle portion 18a.

As illustrated in FIG. 1, the body position detecting apparatus 1 includes a camera 21, an image capture board 22, an audio output part 23, a data storage 24, a LAN communicating part 25 and a controller 26. The camera 21 is provided for repeatedly acquiring image data of an area including a driver seat so that image data includes the steering wheel 18 and a driver who is in an operating position where the driver is capable of operating the steering wheel 18. The image capture board 22 temporarily stores the image data acquired with the camera 21. The audio output part 23 outputs audio guidance. The data storage 24 stores various data. The LAN communicating part 25 communicates with other devices including the ECUs 3-8 through the in-vehicle LAN 2. The controller 26 executes various processes based on signals from the image capture board 22, the data storage 24, and the LAN communicating part 25 and controls the audio output part 23 and the LAN communicating part 25.

Figure 5A:
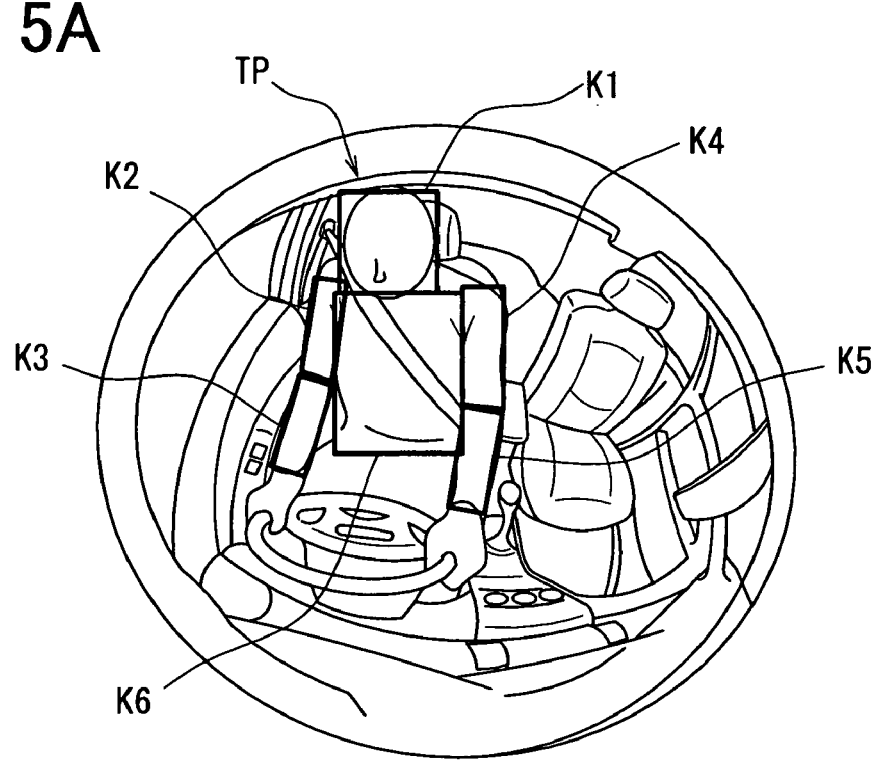
FIG. 5A is a diagram illustrating a model body template and FIG. 5B is a diagram illustrating a deformation allowable range of the model body template.
Figure 5B:
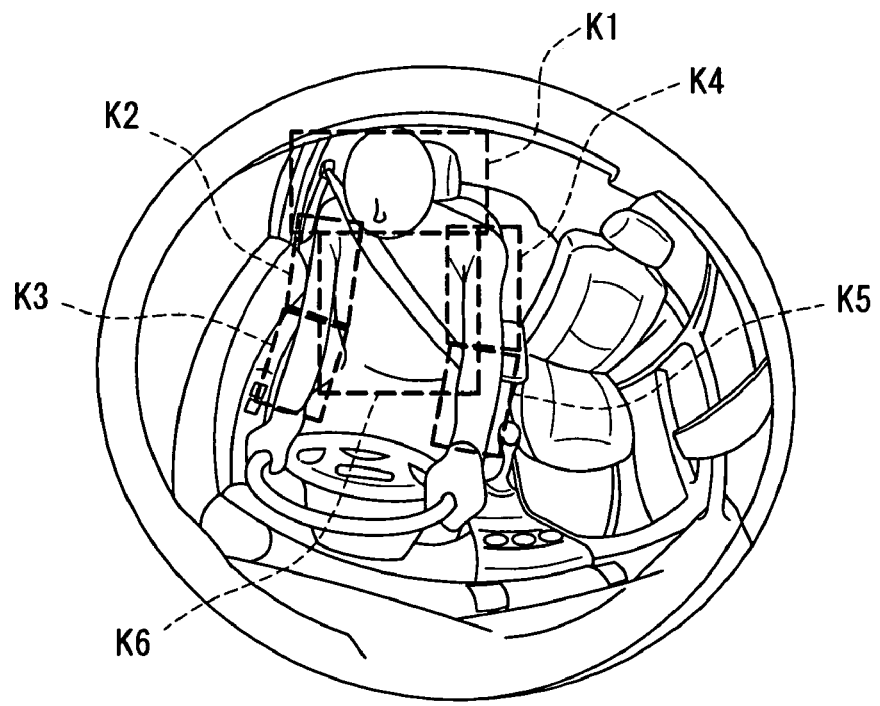

The data storage 24 is configured by a magnetic storage device such as a hard disk. The data storage 24 stores body position detecting information. The body position detecting information includes a model body template TP and a deformation allowable range of the model body template TP. As illustrated in FIG. 5A, the model body template TP represents a typical position of the driver at a time when the driver operates the steering wheel 18, for example, by six rectangles. The six rectangles include a face angle K1, a right upper arm rectangle K2, a right forearm rectangle K3, a left upper arm rectangle K4, a left forearm rectangle K5, and a trunk rectangle K6. The deformation allowable range of the model body template TP is represented by six rectangles K1a-K6a. For example, the rectangles K1a-K6a are about twice wider than the rectangles K1-K6, respectively.

The controller 26 includes a microcomputer configured by a central processing unit (CPU), a read only memory (ROM), a random access memory (RAM), an input/output device (I/O), and a bus that couples the CPU, the ROM, the RAM, and the I/O. The controller 26 executes various processes based on programs stored in the ROM and the RAM.

In the body position detecting apparatus 1, the controller 26 repeatedly executes a body position detecting process for detecting a position of the body part of the driver while the controller 26 is activated.

Figure 3:
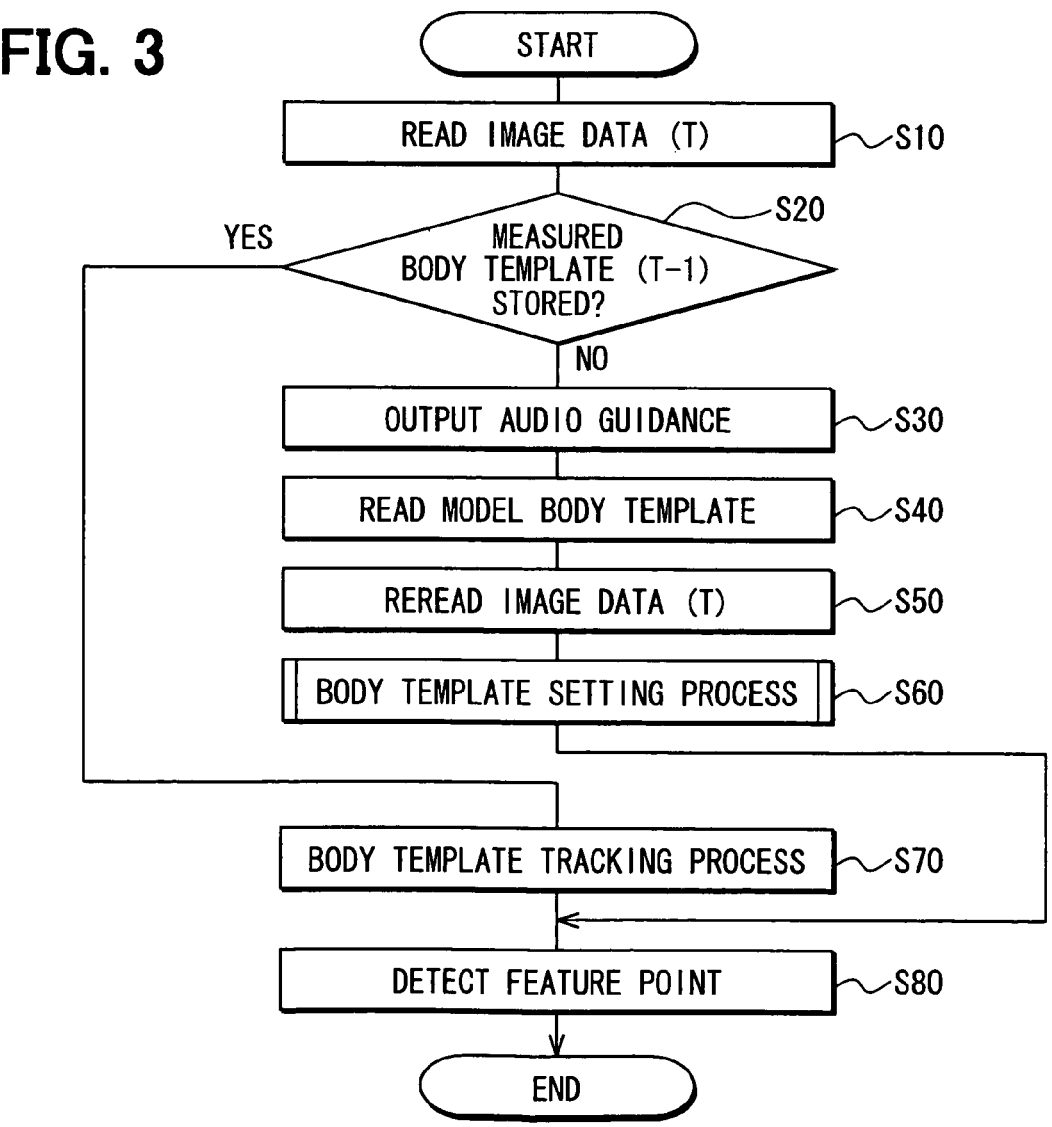
FIG. 3 is a flowchart illustrating a body position detecting process according to the first embodiment.

As illustrated in FIG. 3, when the body position detecting process is started, a control signal from the controller 26 causes the camera 21 to take an image data (T) and the controller 26 reads the image data (T) from the camera 21 at S10. An image identification number "T" of the image data (T) is a number for identifying a plurality of image data taken with the camera 21. The image identification number is added one each time the image data is taken with the camera 21.

At S20, the controller 26 determines whether a measured body template (T-1) set at S60 or S70 is stored in the data storage 24. An identification number "T-1" of the measured body template (T-1) is a number for identifying the measured body template set at S60 or S70. The identification number of the measured body template has the same number as corresponding image data that is measured for setting the measure body template. For example, in a case where the measured body template is set from the image data (T), the measured body template has the identification number "T" and is expressed as the measured body template (T).

If the measured body template (T-1) is not stored in the data storage 24, corresponding to "NO" at S20, a control signal is transmitted from the controller 26 to the audio output part 23 at S30. Then, the audio output part 23 outputs an audio guidance that instructs the driver to grip the steering wheel 18 with both hands. At S40, the controller 26 reads the model body template TP from the data storage 24. At S50, the controller 26 deletes the image data (T) read at S10 and transmits a control signal to the camera 21. Then, the camera 21 retakes an image data (T) and the controller 26 rereads the image data (T) from the camera 21. The image data (T) read at S50 has the same identification number as the image data (T) read at S10.

Figure 6A:
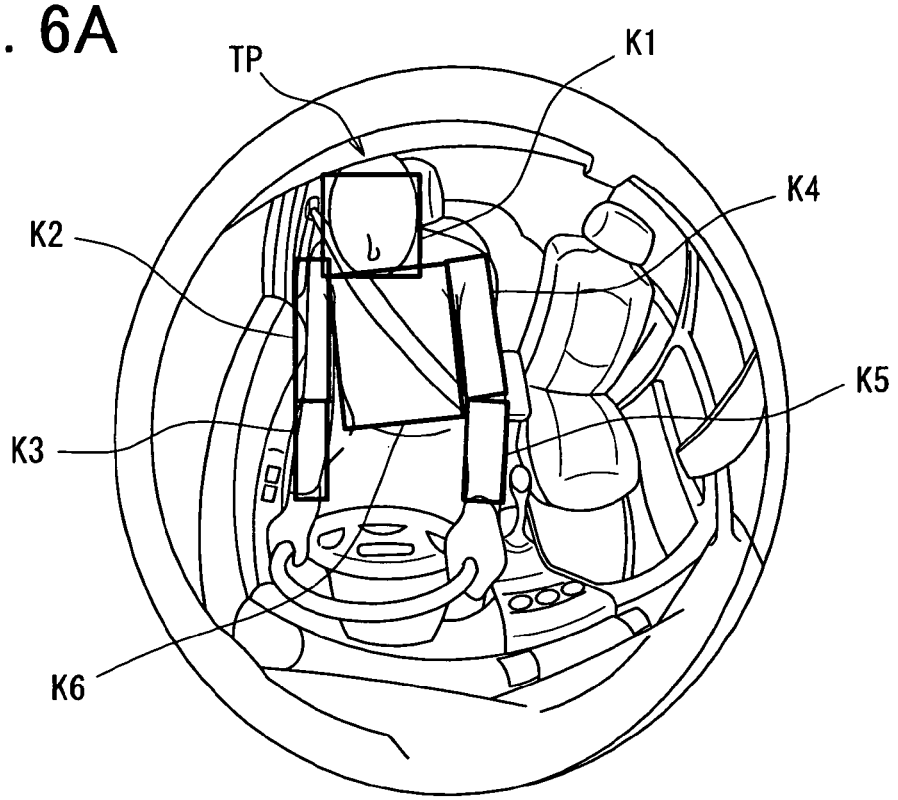
FIG. 6A is a diagram illustrating a method of applying the model body template to a driver in image data and FIG. 6B is a diagram illustrating a position of each feature point.
Figure 6B:
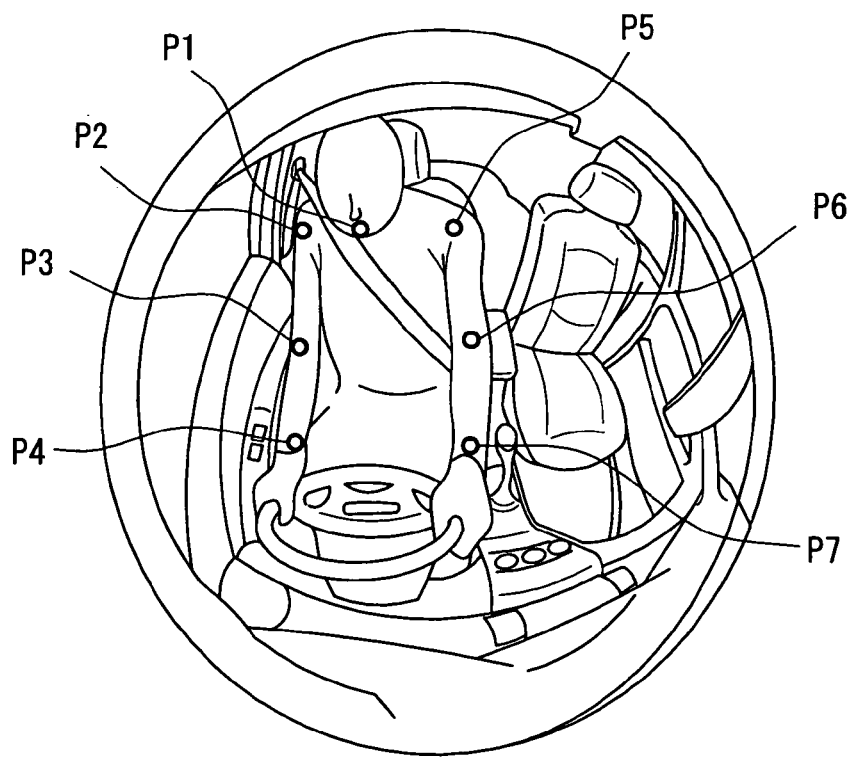

At S60, the controller 26 executes a body template setting process. In the body template setting process, the model body template TP read at S40 is applied to the driver in the image data (T) read at S50 as illustrated in FIG. 6A, and thereby the measured body template (T) is set. Then, the process proceeds to S80. The measured body template (T) set at S60 is defined as an initial position body template.

If the measured body template (T-1) is stored in the data storage 24, corresponding to "YES" at S20, the process proceeds to S70. At S70, the controller 26 executes a body template tracking process, for example, by using a method disclosed in Masanobu Yamamoto, "Ubiquitous Motion Capture and Applications Thereof", an academic conference of "Study of Visual Information for Detecting A Human Body", at a small hall of a library in Osaka Electro-Communication University, 2004. The controller 26 detects a displacement of the driver in the image data (T) from the measured body template (T-1). Then, the controller 26 accumulates the displacement to an initial position based on the initial position body template detected at S60, and thereby the measured body template (T) is set. After that, the process proceeds to S80.

At S80, the controller 26 detects a feature point P1 of a neck, a feature point P2 of a right shoulder, a feature point P3 of a right elbow, a feature point P4 of a right wrist, a feature point P5 of a left shoulder, a feature point P6 of a left elbow, and a feature point P7 of a left wrist from the measured body template (T) set at S60 or S70. For example, a middle point of a lower side of the face rectangle K1 is set to the feature point P1, a middle point of an upper side of the right upper arm rectangle K2 is set to the feature point P2, a middle point of a lower side of the right upper arm rectangle K2 is set to the feature point P3, a middle point of a lower side of the right forearm rectangle K3 is set to the feature point P4, a middle point of an upper side of the left upper arm rectangle K4 is set to the feature point P5, a middle point of a lower side of the left upper arm rectangle K4 is set to the feature point P6, a middle point of a lower side of the left forearm rectangle K5 is set to the feature point P7. When the process at S80 ends, the controller 26 ends the body position detecting process once.

Figure 4:
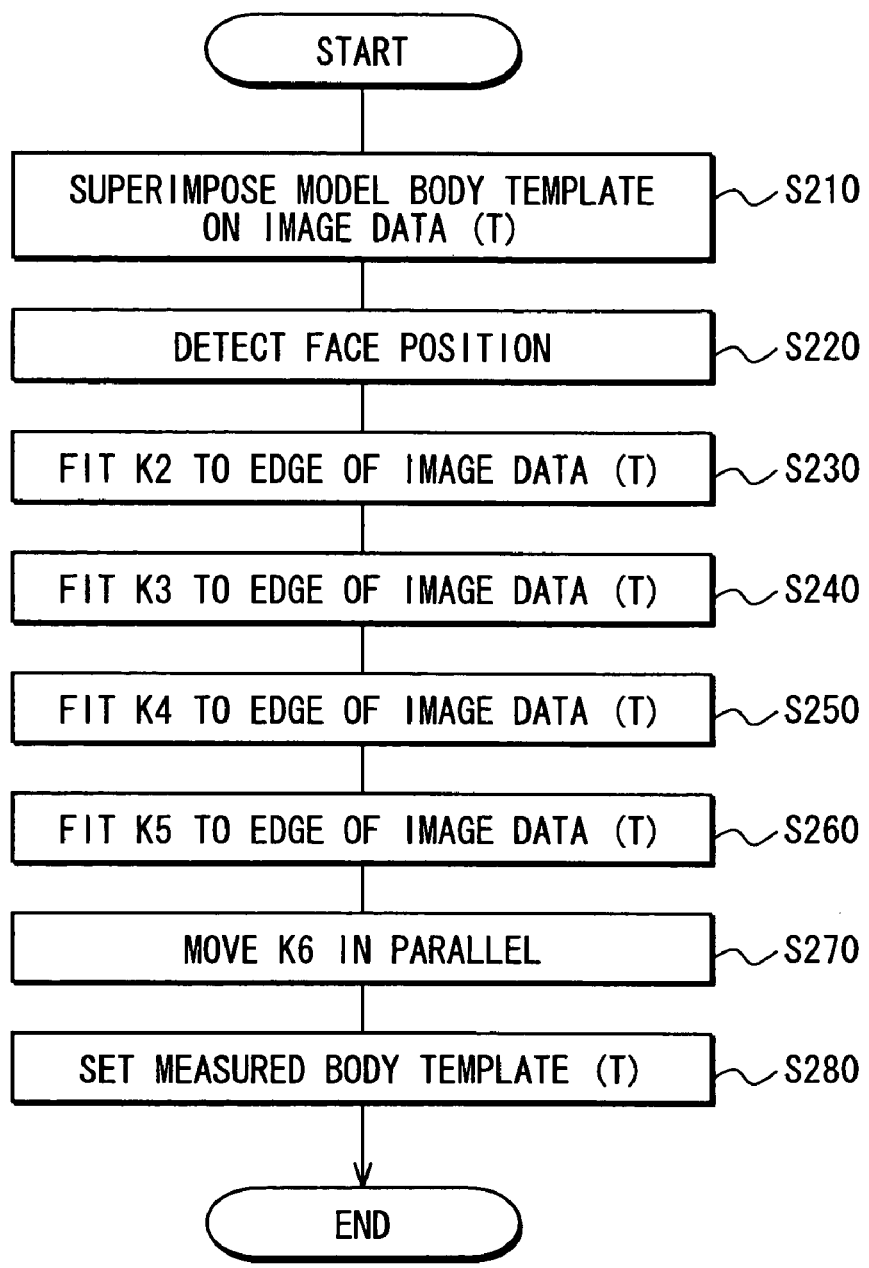
FIG. 4 is a flowchart illustrating a body template setting process.

Next, the body template setting process performed at S60 will be described with reference to FIG. 4. When the controller 26 starts the body template setting process, the controller 26 superimposes the model body template TP read at S40 on the image data (T) at S210. At S220 the controller 26 detects a position of a face of the driver within the deformation allowable range K1$a$ of the face rectangle K1. For example, the controller 26 uses a method disclosed in P. Viola and M. Jones, "Robust real-time object detection", In ICCV Workshop on Statistical and Computation Theories of Vision, Vancouver, Canada, 2001, for detecting the position of the face.

At S230, the controller 26 detects an edge of the image data (T) within the deformation allowable range K2$a$ of the right upper arm rectangle K2 and fits the right upper arm rectangle K2 to the edge. At S240, the controller 26 detects an edge of the image data (T) within the deformation allowable range K3$a$ of the right forearm rectangle K3 and fits the right forearm rectangle K3 to the edge. At S250, the controller 26 detects an edge of the image data (T) within the deformation allowable range K4$a$ of the left upper arm rectangle K4 and fits the left upper arm rectangle K4 to the edge.

At S260, the controller 26 detects an edge of the image data (T) within the deformation allowable range K5$a$ of the left forearm rectangle K5 and fits the left forearm rectangle K5 to the edge. At S270, the controller 26 moves the trunk rectangle K6 in parallel so that an upper side of the trunk rectangle K6 corresponds to the lower side of the face rectangle K1.

At S280, the controller 26 sets the fitted rectangles K1-K6 as the measured body template (T) and stores the measured body template (T) in the data storage 24. Then, the controller 26 ends the body template setting process. As described above, in the body position detecting process according to the present embodiment, the controller 26 repeatedly acquires the image data (T) that includes the steering wheel 18 and the driver at a position where the driver is capable of operating the steering wheel 18. If the measured body template (T-1) is not stored in the data storage 24, corresponding to "NO" at S20, the audio output part 23 outputs the audio guidance that instructs the driver to grip the steering wheel 18 with the both hands at S30. Then, the controller 26 reads the model body template TP from the data storage 24 at S40 and rereads the image data (T) at S50. At S60, the controller 26 sets the initial position body template by fitting the model body template TP to the driver in the image data (T) read at S50. After setting the initial position body template, if the measured body template (T-1) is stored in the data storage 24, corresponding to "YES" at S20, the process proceeds to S70 where the controller 26 sets the measured body template (T) by detecting the displacement of the driver in the image data (T) from the measured body template (T-1) and accumulating the displacement to the initial position.

In the body position detecting apparatus 1, because the audio guidance is provided at S30, the driver in the image data (T) read after the audio guidance grips the steering wheel 18 with the both hands with a high degree of certainty. Thus, in the body template setting process at S60, the initial position body template can be detected by using a state where the driver grips the steering wheel 18 with the both hands as a constraint condition. As a result, the initial position body template can be detected easily compared with a case where the initial position body template is detected without a constraint condition.

In the present embodiment, the process at S10 and the process at S50 correspond to image acquisition means, the process at S60 corresponds to initial position detecting means, the process at S70 corresponds to accumulating means, the steering wheel 18 corresponds to an operated object, the determination condition at S20 corresponds to a instruction condition, the measured body template (T) corresponds to a position of a body part of an operator, for example.

Second Embodiment

A body position detecting apparatus 1 according to a second embodiment of the invention will be described with reference to FIG. 7-FIG. 10C. In the present embodiment, a part different from the first embodiment will be mainly described.

Figure 10A:
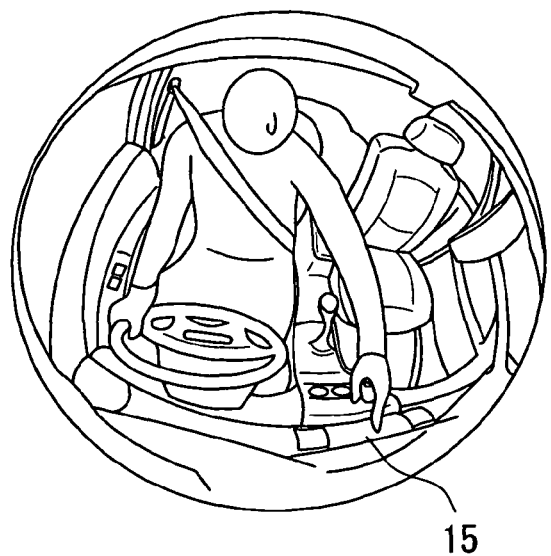
FIG. 10A is a diagram illustrating a body position when the driver operates a navigation switch.
Figure 10B:
FIG. 10B is a diagram illustrating a body position when the driver operates an air-conditioner switch.
Figure 10C:
FIG. 10C is a diagram illustrating a body position when the driver operates a shift lever.

In the present body position detecting apparatus 1, body position detecting information stored in the data storage 24 includes a model body template TP in a state where the driver operates the navigation switch 15 as illustrated in FIG. 10A, a model body template TP in a state where the driver operates the A/C switch 16 as illustrated in FIG. 10B, and a model body template TP in a state where the driver operates the shift lever as illustrated in FIG. 10C in addition to the model body template TP in a state where the driver operates the steering wheel 18.

Figure 7:
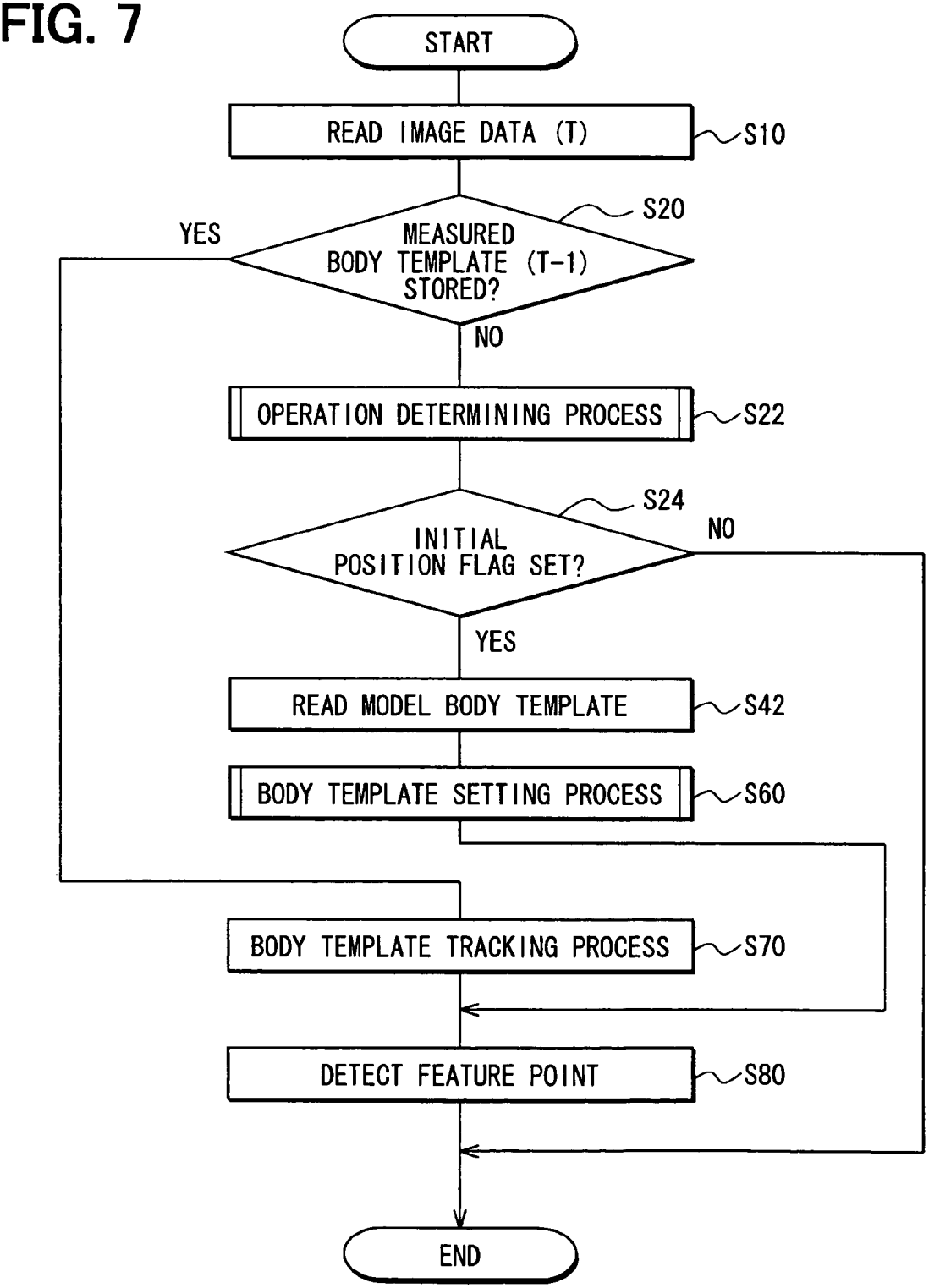
FIG. 7 is a flowchart illustrating a body position detecting process according to a second embodiment of the invention.

As illustrated in FIG. 7, in a body position detecting process according to the present embodiment, the processes at S30-S50 in the body position detecting process according to the first embodiment are omitted and processes at S22, S24, and S42 are added.

If the measured body template (T-1) is not stored in the data storage 24, corresponding to "NO" at S20, the process proceeds to S22 where the controller 26 executes an operation determining process for determining which equipment among the steering wheel 18, the navigation switch 15, the A/C switch 16, and the shift lever is operated by the driver. At S24, the controller 26 determines whether an initial position flag that is set or cleared at S22 is set.

If the initial position flag is not set, corresponding to "NO" at S24, the controller 26 ends the body position detecting process once. If the initial position flag is set, corresponding to "YES" at S24, the process proceeds to S42 where the controller 26 reads the model body template TP corresponding to the equipment that is determined to be operated by the driver at S22. Then, the process proceeds to S60.

The operation determining process performed at S22 will be described with reference to FIG. 8. When the controller 26 starts to execute the operation determining process, the controller 26 determines whether the driver grips the steering wheel 18 by the both hands at S410, for example, by determining whether two of the touch sensors 17 are turned on.

If two touch sensors 17 are turned on, corresponding to "YES" at S410, the process proceeds to S450. If two touch sensors 17 are not turned on, corresponding to "NO" at S410, the process proceeds to S420 where the controller 26 determines whether the navigation switch 15 is operated. For example, the controller 26 determines whether the navigation switch 15 including the present location switch and the broad/detail switch is turned on.

If the navigation switch 15 is operated, corresponding to "YES" at S420, the process proceeds to S450. When the navigation switch 15 is not operated, corresponding to "NO" at S420, the process proceeds to S430 where the controller 26 determines whether the A/C switch 16 including the on/off switch and the temperature setting switch is operated. For example, the controller 26 determines whether the A/C switch 16 is turned on.

If the A/C switch 16 is operated, corresponding to "YES" at S430, the process proceeds to S450. If the A/C switch 16 is not operated, corresponding to "NO" at S430, the process proceeds to S440 where the controller 26 determines where the position of the shift level is changed, for example, from N to D or from D to R, based on the detection signal from the shift switch 12.

If the position of the shift lever is changed, corresponding to "YES" at S440, the process proceeds to S450. If the position of the shift lever is not changed, corresponding to "NO" at S440, the process proceeds to S470 where the controller 26 clears the initial position flag. Then, the controller 26 ends the operation determining process.

At S450, the controller 26 determines whether the steering angle is in a predetermined range, for example, from about −19.6 degree to about +18.1 degree.

If the steering angle is out of the predetermined range, corresponding to "NO" at S450, the process proceeds to S470 where the controller 26 clears the initial position flag. Then, the controller 26 ends the operation determining process. If the steering angle is in the predetermined range, corresponding to "YES" at S450, the process proceeds to S460 where the controller 26 sets the initial position flag. Then, the controller 26 ends the operation determining process.

Figure 9:
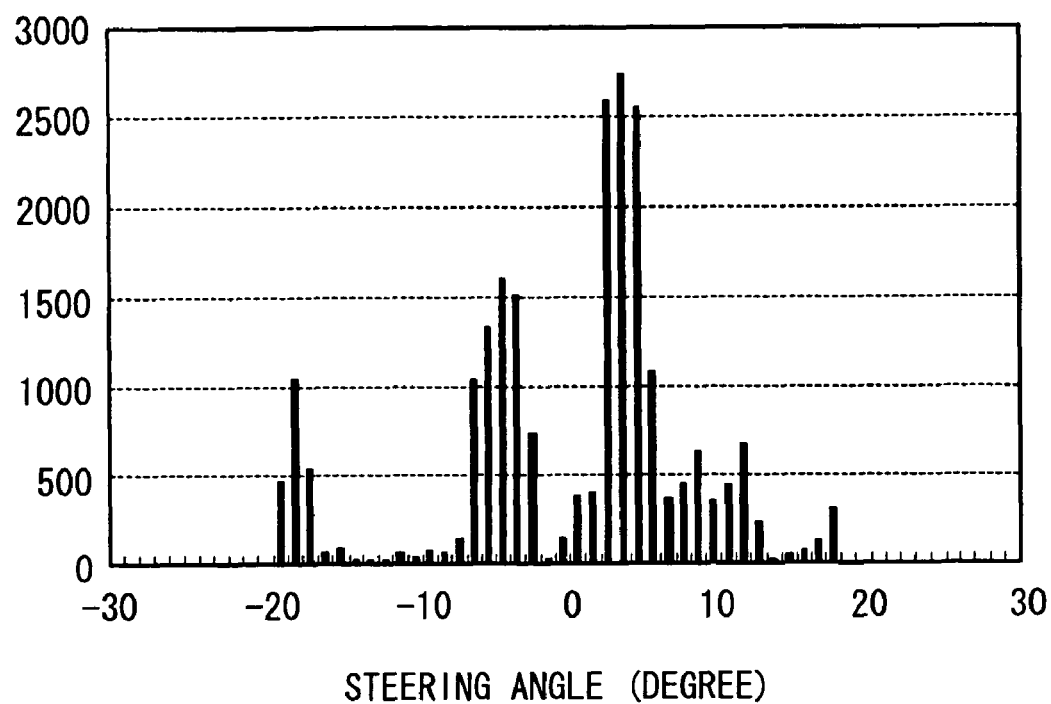
FIG. 9 is a graph illustrating a distribution of a steering angle when a driver operates a steering wheel in a state where the driver faces front.

The predetermined range can be determined by measuring the steering angle at a time when the driver operates the steering wheel 18 so that the vehicle goes straight in a state where the driver faces front, as demonstrated by the inventors. According to a measured result demonstrated by the inventors, the steering angle at a time when the driver drives the vehicle along the straight road in the state where the driver faces front is in a range from about −19.6 degree to about +18.1 degree, as illustrated in FIG. 9. Thus, the predetermined range is set to the range from about −19.6 degree to about +18.1 degree. In the present case, an angle in a clockwise direction is expressed as a plus angle and an angle in a counterclockwise direction is expressed as a minus angle.

As described above, in the body position detecting process according to the present embodiment, the controller 26 repeatedly acquires the image data (T) that includes the steering wheel 18 and the driver at a position where the driver is capable of operating the steering wheel 18. If the measured body template (T-1) is stored in the data storage 24, corresponding to "NO" at S20, the process proceeds to S22 where the controller 26 determines which equipment among the steering wheel 18, the navigation switch 15, the A/C switch 16, and the shift lever is operated. If the controller 26 determines that one of the equipment is operated, corresponding to "YES" at S24, the process proceeds to S42 where the controller 26 reads the model body template TP corresponding to the equipment that is determined to be operated by the driver at S22. Then, the process proceeds to S60. At S60, the controller 26 measures the initial position body template by fitting the model body template TP corresponding to the operated equipment to the driver in the image data (T). After setting the initial body position template, if the measured body template (T-1) is stored in the data storage 24, corresponding to "YES" at S20, the process proceeds to S70 where the controller 26 sets the measured body template (T) by detecting the displacement of the driver in the image data (T) from the measured body template (T-1) and accumulating the displacement to the initial position.

In the body position detecting apparatus 1 according to the present embodiment, the image data (T) that is acquired at a time when the controller 26 determines that the driver operates one of the steering wheel 18, the navigation switch, the A/C switch 16 and the shift lever is used for the body template detecting process at S60. Thus, at S60, the controller 26 can detect the initial position body template by using a state where the driver operates one of the steering wheel 18, the navigation switch 15, the A/C switch, and the shift lever as a constraint condition. As a result, the initial position body template can be detected easily compared with a case where the initial position body template is detected without a constraint condition.

At S410-S440, the controller 26 detects which equipment among the steering wheel 18, the navigation switch 15, the A/C switch 16, and the shift lever is operated by the driver, based on the detection signal from corresponding one of the touch sensors 17, the navigation switch 15, the A/C switch 16, and the shift switch 12. Thus, the operation determining process can be easily realized compared with a case where the operation determining process is realized by an image processing.

The driver frequently operates the steering wheel 18 while the driver drives the vehicle. Thus, by disposing the touch sensors 17 at the steering wheel 18, the process at S60 can be frequently executed.

If the steering angle is in the predetermined range, for example, from about −19.6 degree to about +18.1 degree, corresponding to "YES" at S450, the controller 26 executes the process at S60. Thus, the controller 26 can detect the initial position body template at the time when the vehicle goes straight and can discriminate the time when the vehicle goes straight from the time when the vehicle turns right or left. Furthermore, the controller 26 can easily determine whether the vehicle goes straight.

In the present embodiment, the process at S10 corresponds to image acquisition means, the process at S22 corresponds to position detecting means, the process at S60 corresponds to initial position detecting means, the process at S70 corresponds to accumulating means, and the steering wheel 18, the navigation switch 15, the A/C switch 16 and the shift lever correspond to an operated object, for example.

In addition, the touch sensors 17, the navigation switch 15, the A/C switch 16, and the shift switch 12 correspond to operation detecting means, the navigation switch 15, the A/C switch 16, and the shift switch 12 correspond to an electronic device provided in the vehicle, and the steering angle sensor 14 corresponds to vehicle state detecting means.

Third Embodiment

A body position detecting apparatus 1 according to a third embodiment of the invention will be described with reference to FIG. 11 and FIG. 12. In the present embodiment, a part different from the second embodiment will be mainly described.

Figure 11:
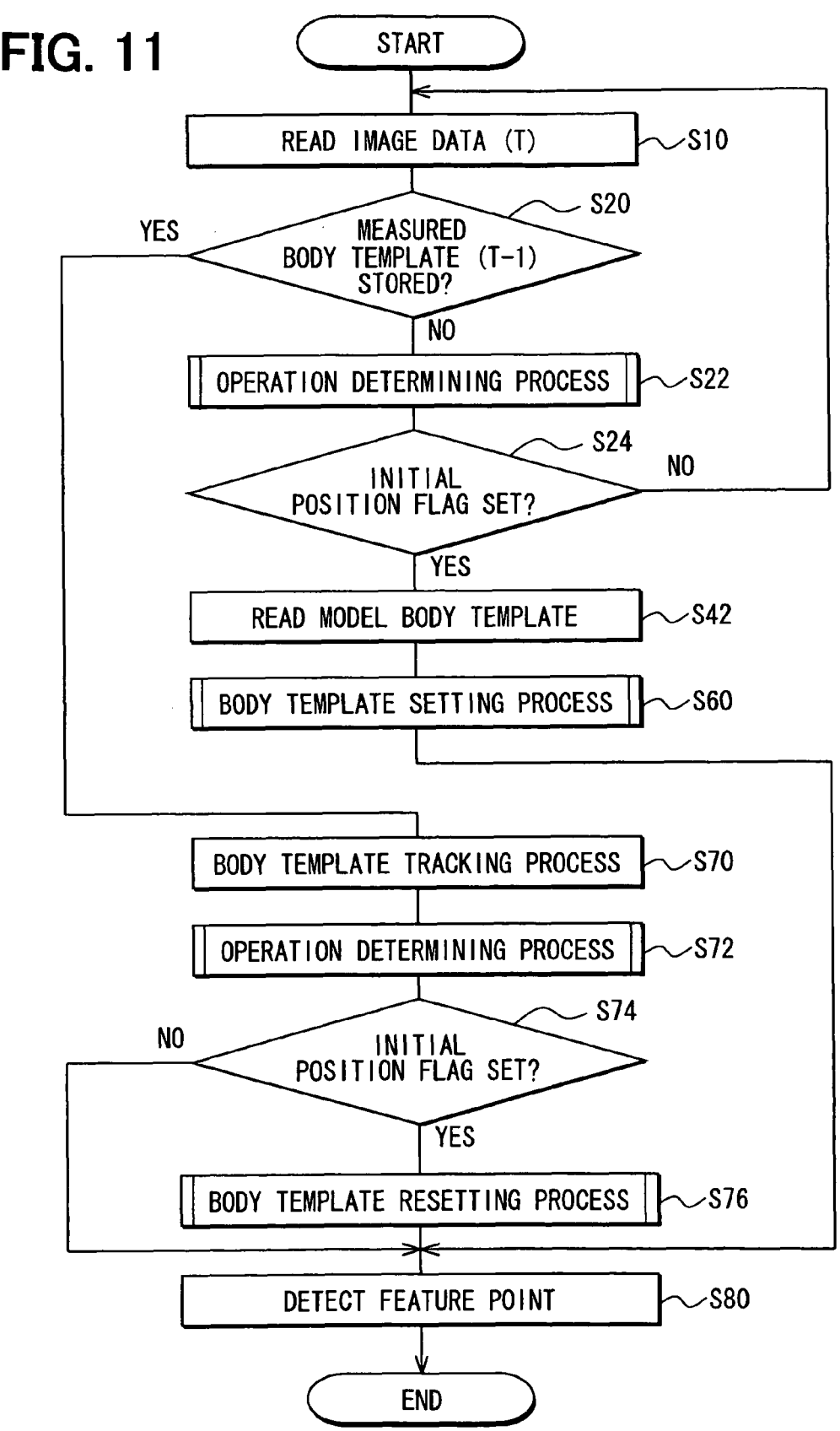
FIG. 11 is a flowchart illustrating a body position detecting apparatus according to a third embodiment of the invention.
Figure 12:
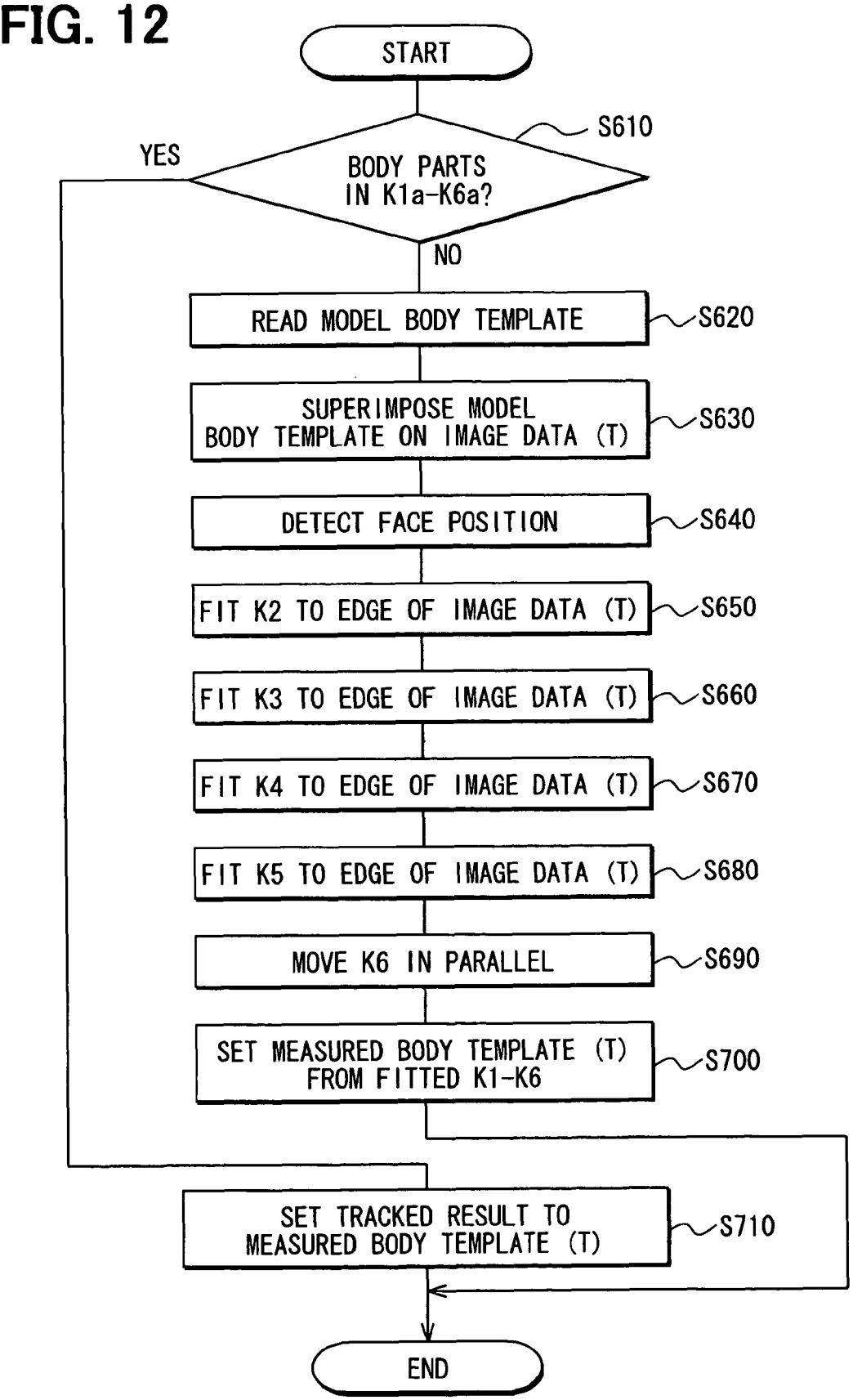
FIG. 12 is a flowchart illustrating a body template resetting process.

As illustrated in FIG. 11, in a body position detecting process according to the present embodiment, processes at S72, S74, and S76 are added to the body position detecting process according to the second embodiment. That is, after the process at S70 is finished, the process proceeds to S72 where the controller 26 executes a similar process to S22 in FIG. 7. Then, the process proceeds to S74 where the controller 26 determines whether the initial position flag that is set or cleared at S72 is set.

If the initial position flag is not set, corresponding to "NO" at S74, the process proceeds to S80. If the initial position flag is set, corresponding to "YES" at S74, the controller 26 executes a body template resetting process at S76. Then, the process proceeds to S80.

Next, the body template resetting process at S76 will be described with reference to FIG. 12. When the controller 26 starts the body template resetting process, at S610, the controller 26 determines whether each of six body parts tracked at S70, that is, each of the face, the right upper arm, the right forearm, the left upper arm, the left forearm, and the trunk is located in corresponding one of the deformation allowable ranges K1a-K6a.

If all of the six body parts is located in the corresponding deformation allowable ranges K1a-K6a, corresponding to "YES" at S610, the controller 26 sets the tracked result at S700 to the measured body template (T) and stores the measured body template (T) at the data storage 24. Then, the controller 26 ends the body template resetting process.

If at least one of the six body parts is located at an outside of the corresponding one of the deformation allowable ranges K1a-K6a, corresponding to "NO" at S610, the process proceeds to S620. At S620, the controller 26 reads the model body template TP that corresponds to the equipment determined to be operated at the operation determining process at S72 from the data storage 24. Then, at S630, the controller 26 superimposes the model body template TP on the image data (T).

At S640 the controller 26 detects the position of the face of the driver within the deformation allowable range K1a of the face rectangle K1. At S650, the controller 26 detects an edge of the image data (T) within the deformation allowable range K2a of the right upper arm rectangle K2 and fits the right upper arm rectangle K2 to the edge. At S660, the controller 26 detects an edge of the image data (T) within the deformation allowable range K3a of the right forearm rectangle K3 and fits the right forearm rectangle K3 to the edge. At S670, the controller 26 detects an edge of the image data (T) within the deformation allowable range K4a of the left upper arm rectangle K4 and fits the left upper arm rectangle K4 to the edge.

At S680, the controller 26 detects an edge of the image data (T) within the deformation allowable range K5a of the left forearm rectangle K5 and fits the left forearm rectangle K5 to the edge. At S690, the controller 26 moves the trunk rectangle K6 in parallel so that the upper side of the trunk rectangle K6 corresponds with the lower side of the face rectangle K1.

At S700, the controller 26 sets the fitted rectangles K1-K6 as the measured body template (T) and stores the measured body template (T) in the data storage 24. Then, the body template resetting process ends.

In the body position detecting process according to the present embodiment, at S72, the controller 26 determines which equipment among the steering wheel 18, the navigation switch 15, the A/C switch 16, and the shift lever is operated. If the controller 26 determines that one of the equipment is operated, corresponding to "YES" at S74, and the controller 26 determines that at least one of the six body parts tracked at S70 is located at the outside of the corresponding one of the deformation allowable ranges K1a-K6a, corresponding to "NO" at S610, the initial body position template is reset at S620-S700.

Thus, even if the driver continues to operate the steering wheel 18, the initial position body template is not reset until the accumulating error of the measured body template (T) increases, and thereby one of the six body parts, that is, one of the face, the right upper arm, the right forearm, the left upper arm, the left forearm, and the trunk is determined to be located at the outside of the corresponding one of the deformation allowable ranges K1a-K6a. As a result, the body position detecting apparatus 1 can restrict an increase of a processing load.

In addition, because the accumulation of the detection error of the displacement can be canceled by resetting the initial position body template, the detection error of the position of the body part can be reduced.

In the present embodiment, the process at S610 corresponds to operating position determining means, for example.

Other Embodiments

Although the present invention has been fully described in connection with the preferred embodiments thereof with reference to the accompanying drawings, it is to be noted that various changes and modifications will become apparent to those skilled in the art.

Figure 8:
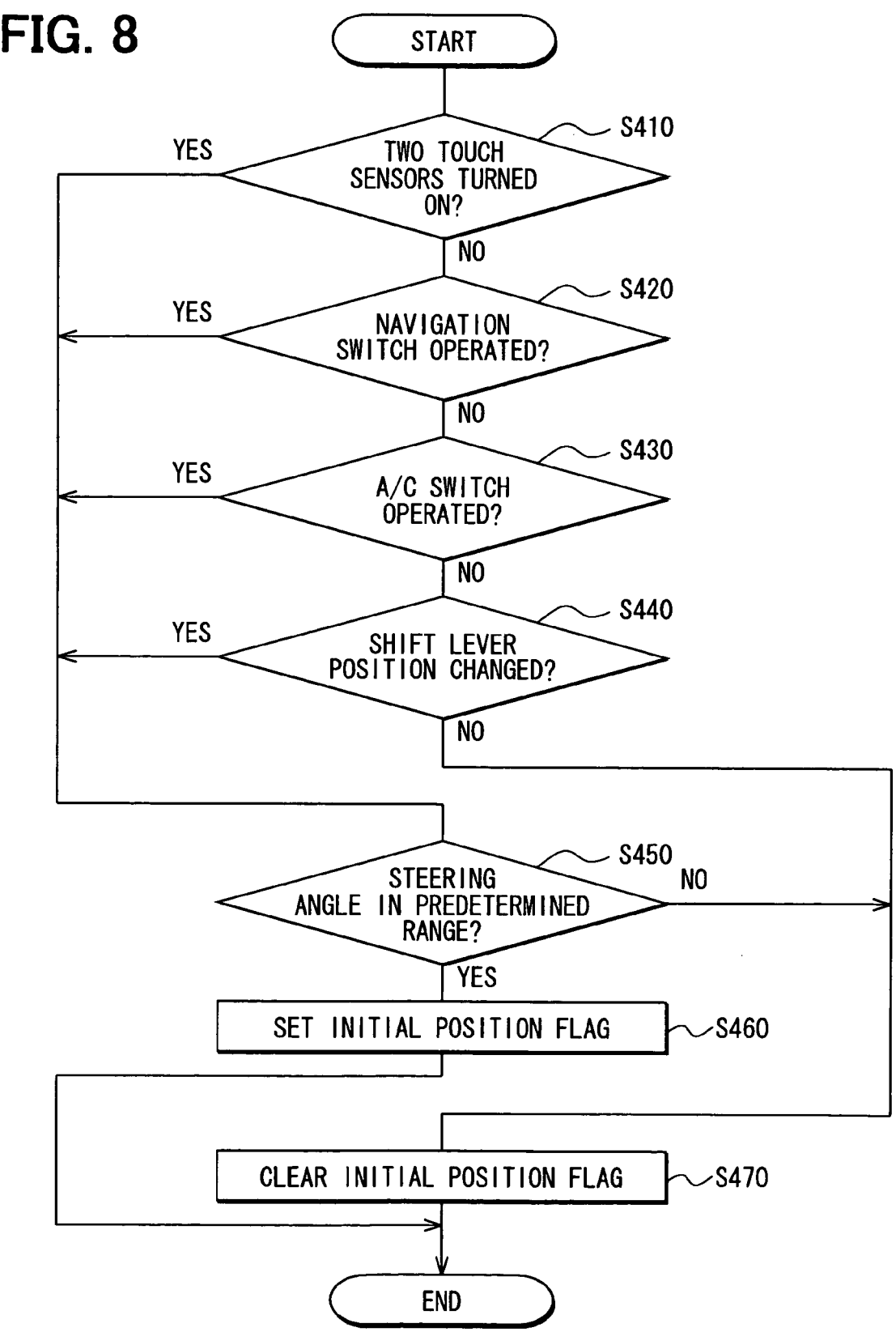
FIG. 8 is a flowchart illustrating an operation determining process.

For example, in the operation determining process illustrated in FIG. 8, the process at S450 is performed when one of the determinations at S410-S440 is "YES." Alternatively, the process may proceed to S460 without executing the process at S450 when one of the determinations at S410-S440 is "YES."

In the above-described embodiments, the audio output part 23 outputs the audio guidance for instructing the driver to grip the steering wheel 18 with the both hands just after the body position detecting apparatus 1 is activated. Alternatively, the audio output part 23 may start to output the audio guidance when an operation for outputting the audio guidance is performed, for example, by pushing an audio guidance starting button.

What is claimed is:

1. A body position detecting apparatus comprising:
    image acquisition means for repeatedly acquiring operator image data that includes an operation object and an operator in a place where the operator is capable of operating the operation object;
    instructing means for instructing the operator to operate the operation object when a predetermined instruction start condition is satisfied;
    first initial position detecting means for detecting an operator body part position that is a position of a body part of the operator included in the operator image data acquired by the image acquisition means after the instructing means instructs; and
    first accumulating body part position detecting means for setting the detected operator body part position to an initial position after the operator body part position is detected by the first initial position detecting means and for detecting the operator body part position in the operator image data that is acquired after the initial position is set, by detecting a displacement from the operator body part position detected last time and accumulating the displacement to the initial position.

2. The body position detecting apparatus according to claim 1,
    wherein the operator is a driver of a vehicle; and
    wherein the operation object is a steering wheel of the vehicle.

3. A body position detecting apparatus comprising:
    image acquisition means for repeatedly acquiring operator image data that includes an operation object and an operator in a place where the operator is capable of operating the operation object;
    position detecting means for detecting that the operator is in an operating position where the operator operates the operation object;
    second initial position detecting means for detecting an operator body part position that is a position of a body part of the operator included in the operator image data acquired by the image acquisition means after the position detecting means detects that the operator is in the operating position; and
    second accumulating body part position detecting means for setting the detected operator body part position to an initial position after the operator body part position is detected by the second initial position detecting means and for detecting the operator body part position in the operator image data that is acquired after the initial position is set, by detecting a displacement from the operator body part position detected last time and accumulating the displacement to the initial position.

4. The body position detecting apparatus according to claim 3, further comprising
    operating position determining means for determining whether the operator body part position detected by the second accumulating body part position detecting means corresponds to the operating position when the position detecting means detects that the operator is in the operating position,
    wherein the second initial position detecting means redetects the operator body part position when the operating position determining means determines that the operator body part position detected by the second accumulating body part position detecting means does not correspond to the operating position detected by the position detecting means.

5. The body position detecting apparatus according to claim 3, further comprising
    operation detecting means for detecting that the operation object is operated,
    wherein the position detecting means detects that the operator is in the operating position when the operation detecting means detects that the operation object is operated.

6. The body position detecting apparatus according to claim 5,
    wherein the operation detecting means is a touch sensor disposed at the operation object for detecting that the operation object is touched.

7. The body position detecting apparatus according to claim 6,
    wherein the body position detecting apparatus is disposed in a vehicle, and
    wherein the touch sensor is disposed at a steering wheel of the vehicle.

8. The body position detecting apparatus according to claim 5,
    wherein the body position detecting apparatus is disposed in a vehicle, and
    wherein the operation detecting means is an in-vehicle device disposed in the vehicle and configured to output a signal when the in-vehicle device is operated by an occupant of the vehicle.

9. The body position detecting apparatus according to claim 8, wherein the in-vehicle device includes a shift switch for detecting a selected position of a shift lever of the vehicle.

10. The body position detecting apparatus according to claim 8,
    wherein the in-vehicle device includes a navigation switch for controlling a navigation device provided in the vehicle.

11. The body position detecting apparatus according to claim 8, wherein the in-vehicle device includes an air-conditioner switch for controlling an air conditioner of the vehicle.

12. The body position detecting apparatus according to claim 5,
    wherein the body position detecting apparatus is disposed in a vehicle,
    wherein the body position detecting apparatus further comprises vehicle state detecting means for detecting a state of the vehicle in which the body position detecting apparatus is disposed, and
    wherein the position detecting means determines whether the operator is in the operating position based on the state of the vehicle detected by the vehicle state detecting means when the operation detecting means detects that the operation object is operated.

13. The body position detecting apparatus according to claim 12, wherein the vehicle state detecting means is a steering angle sensor for detecting a steering angle of the vehicle.

14. The body position detecting apparatus according to claim 13, wherein the operating position is a position of a driver in a state where the driver operates the steering wheel so that the vehicle goes straight, and wherein the position detecting means detects that the operator is in the operating position when the steering angle detected by the vehicle state detecting means is in a predetermined range including zero degrees.

* * * * *